United States Patent [19]

Friedman et al.

[11] Patent Number: 4,789,557

[45] Date of Patent: Dec. 6, 1988

[54] FOODSTUFFS CONTAINING STARCH OF A DULL WAXY GENOTYPE

[75] Inventors: Robert B. Friedman, Chicago, Ill.; David J. Gottneid, Griffith, Ind.; Eugene J. Faron, Schererville, Ind.; Frank J. Pustek, Munster, Ind.; Frances R. Katz, Crown Point, Ind.

[73] Assignee: American Maize-Products Company, Stamford, Conn.

[21] Appl. No.: 36,571

[22] Filed: Apr. 10, 1987

[51] Int. Cl.[4] .................... A23L 1/04; A23L 1/195
[52] U.S. Cl. .................................. 426/578; 426/579; 426/589
[58] Field of Search ............... 426/578, 579, 589, 658, 426/549, 293, 294, 295; 536/902; 127/29, 32

[56] References Cited

U.S. PATENT DOCUMENTS 4,107,338  8/1978  Tutor .............................. 426/549
4,428,972  1/1984  Warzburg ....................... 426/578

OTHER PUBLICATIONS

Abst—Liu et al. Plant Physiol, vol. 67(3) 1981 pp. 518–524 CA 94 (21) 170612j.
Abst—Soberalske et al., Crop Sci 20(2) pp. 201–204, 1980 CA 93 (S) 41737j.
Abst—Garwood, J. Am Soc Hortic Sci 1051, pp. 83–85, 1980 CA 92 (S).
Abst—Garwood, J. Am Soc Hortic Sci 101(4); 400–4, 1976 CA 85 (13) 92388p.
Genetics and Physiology of Starch Development—Chapter III—Jack C. Shannon and Douglas L. Garwood—pp. 25–85.
"Carbohydrate Synthesis in Maize"—Roy G. Creech—Pennsylvania State University—University Park, Pa.—pp. 275–322.
"Some Structural Characteristics of Starches of Maize Having a Specific Genetic Background"—Y. Ikawa et al.—Starch/Stärke 33 Nr. 1, S.9–13.
"The Effects of Genetic Variations in Maize on the Properties of the Starches"—Rudolph M. Sandstedt et al.—pp. 71–98.
"Genetic Control of Carbohydrate Synthesis in Maize Endosperm"—Roy G. Creech—Genetics 52: pp. 1175–1186—Dec. 1965.
"Gene Interactions in Maize Affecting Endosperm Properties"—H. H. Kramer et al.—Agronomy Journal vol. 50 (1958) pp. 207–210.
"Interaction of Dosage Effects on Amylose Content of Corn at the DU and Wx Loci"—J. L. Helm et al.—Journal of Heredity—vol. 60 (1969)—pp. 259–260.
"Genetic Variations in Maize: Effects on the Properties of the Starches"—R. M. Sandstedt et al.—Cereal Science Today—vol. 13, No. 3—Mar. 1968—pp. 82–94 and 156.

Primary Examiner—Jeanette Hunter
Attorney, Agent, or Firm—Lucas & Just

[57] ABSTRACT

A foodstuff thickened with a chemically modified starch extracted from a starch bearing plant having a dull waxy genotype is disclosed. Maize is the preferred plant.

12 Claims, 1 Drawing Sheet

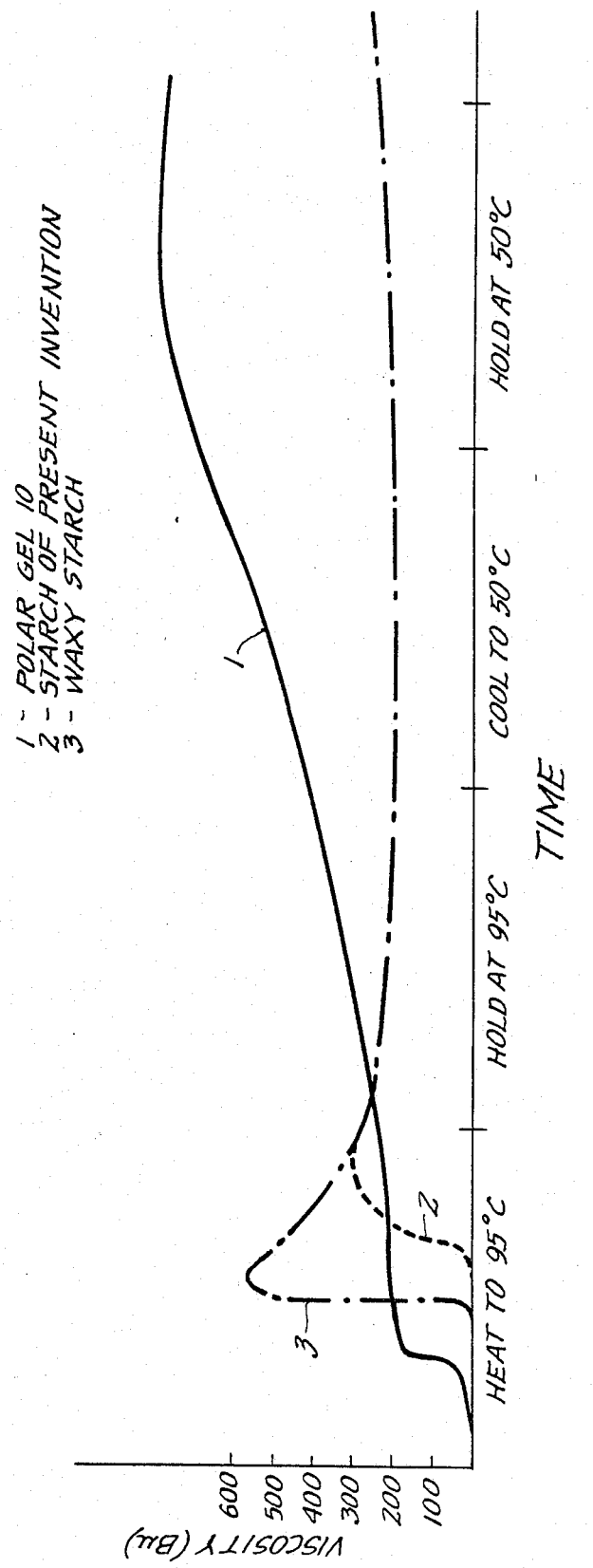

FOODSTUFFS CONTAINING STARCH OF A DULL WAXY GENOTYPE

This invention relates to starch and more particularly to starch which has been extracted from a plant having a dull waxy (duwx) homozygous genotype.

Starch occurs in a variety of plants and is generally categorized based on its plant source. For example, cereal starches are extracted from cereal grains such as maize, rice, wheat, barley, oats and sorghum; tuber and root starches are extracted from plants such as potato, sweet potato, arrowroot, yams and cassava; and waxy starches are extracted from plants such as waxy maize, waxy rice, waxy barley and waxy sorghum.

Generally, starch is comprised of two polymers, amylose and amylopectin which are intertwined to form a starch granule. Amylose is a linear polymer of alpha 1–4 bonded anhydroglucose units while amylopectin is a branched polymer comprised of linear chains of alpha 1–4 linked anhydroglucose units with branches resulting from alpha 1–6 linkages between the linear chains.

Each starch bearing plant produces different percentages of amylose and amylopectin, different size granules and different polymeric weights for both the amylose and amylopectin. These differences produce markedly different properties in the starch.

Heretofore, the only way to affect the properties of starch was to physically and/or chemically treat the starch.

It has recently been discovered that there exists a number of recessive mutant genes in starch bearing plants which have an affect on the properties of starch and that by controlled breeding these mutant genes can be expressed.

Nomenclature for these mutant genes is based in part on the effect these mutant genes have on the physical appearance, phenotype, of the kernel. Some of the mutant genes which have been identified in maize include the genotypes: waxy (wx), amylose extender (ae), dull (du), horny (h), shrunken (sh), brittle (bt), floury (fl), opaque (o), and sugary (su). It is also known that within these genotypes there are genes which produce markedly different starches even though the phenotypes are the same. Such subspecies have generally been given a number after the named genotype, for example, sugary-1 (su1) and sugary-2 (su2).

One combination of these mutant genes which has been found to possess utility is taught in U.S. Pat. No. 4,428,972 issued Jan. 31, 1984 to Wurzburg et al.

It has now been discovered that a plant having a dull waxy (duwx) homozygous genotype will produce a starch having properties comparable to chemically modified starch.

The advantage of such a novel starch is that it may replace chemically modified starches. This provides an economic advantage.

FIG. 1 depicts an amylogram of starch of the present invention, chemically modified starch and native waxy starch.

In order to obtain substantially pure starch in accordance with the present invention a plant which produces edible starch and has a waxy (wx) genotype is crossbred with a plant which produces edible starch and has a dull (du) genotype to produce a plant having a dull waxy (duwx) homozygous genotype. The starch is then extracted from this plant. Both the crossbreeding step and the extraction step of the present invention are carried out in a conventional manner.

In order to prepare a sol in accordance with the present invention, a slurry is prepared which comprises water and an effective amount of starch extracted from a plant of the duwx genotype and the slurry subjected to a cooking step. The slurry is cooked as necessary to provide a thickener composition which exhibit properties comparable to sols made from conventional chemically modified starch. If the starch of the present invention has been made "cold water swellable", then the cooking step may be eliminated. The preferred amount of starch of the present invention used in the slurry constitutes about 1 to 20% by weight of slurry. Generally, cooking entails raising the temperature of the slurry to above about the gelatinization temperature of the starch and subjecting the starch to enough shear such that the granules rupture and a paste is formed. It is not necessary that all the granules rupture.

A sol or a thickener composition of the starch of the present invention is added to a foodstuff in a conventional manner.

Alternatively, starch of the present invention is mixed with a foodstuff or a slurry comprising water and starch of the present invention is mixed with foodstuff and the resulting mixture cooked to produce a thickened foodstuff.

In order to replace chemically modified starch with the starch of the present invention, a replacement ratio of about 1:1, conventional starch:starch of the present invention, may be employed. Larger or smaller amounts of the starch of the present invention may be used to replace the conventional starch.

The term starch as used in the specification and claims means not only the substantially pure starch granules as extracted from a starch bearing plant but also grain products of the starch granule such as flour, grit, hominy and meal.

The term dull waxy or duwx genotype as used in the specification and claims means not only the duwx homozygous genotype, duduwxwx, which has been obtained by standard plant breeding techniques, but also the duwx genotype which has been moved to another portion of the plant genome by translocation, inversion or any other method of chromosome engineering to include variations thereof whereby the disclosed properties of the starch of the present invention are obtained.

Any plant source which produces edible starch and which can be crossbred to produce a plant having a duwx homozygous genotype may be used. It has been found that waxy maize, waxy rice, waxy barley and waxy sorghum have the mutant waxy (wx) genes while the dull (du) gene is obtained from cereal grains such as maize, rice, barley and sorghum. Maize is the preferred plant source. The waxy gene is reported to be located on chromosome 9 of the maize chromosomes. See "Development Genetics", Volume 5, pages 1-25, 1984. The dull gene is reported to be located on chromosome 10 of the maize chromosomes.

Generally, to obtain a starch bearing plant with both double recessive mutants of the du and wx genotype, a plant of a wx mutant is crossed with a plant having a du mutant and thereafter inbred to obtain a plant homozygous in duwx. After the homozygous duwx genotype is obtained, standard breeding techniques are used to obtain hybrid vigor. Hybrids are preferred because of their high starch yield compared to inbred lines. The method of crossing plants and of obtaining specific genotypes in the offspring as well as breeding to obtain hybrid vigor is well known.

Extraction of starch from the plant is well known and typically entails a milling process. In accordance with the present invention, a wet milling process is used to advantage to extract the corn starch from the corn kernels. Corn wet milling comprises the steps of steeping and grinding the corn kernel and then separating the starch from the other components of the kernel. Prior to steeping, the kernels are subjected to a cleaning process to remove any debris which may be present. This cleaning process is usually done at the wet milling plant. The kernels are then steeped in a steep tank where the kernels are contacted with a countercurrent flow of water at an elevated temperature of about 120° F. and containing sulfur dioxide in an amount between about 0.1 to about 0.2% by weight water. The kernels are maintained in the steep tank for about 24 to 48 hours. Next, the kernels are dewatered and subject to a first set of attrition type mills.

The first set of mills generally grind and rupture the kernels causing the germ, corn oil, to be released from the rest of the kernel. A typical attrition type mill used in commercial wet milling processes is sold under the brand name Bauer. The released germ is then separated from the other parts of the kernel by centrifugation. Throughout the griding steps of the wet milling process the kernel and the kernel components are maintained in a slurry of about 40% by weight solids.

The remaining kernel components which include starch, hull, fiber and gluten, are subjected to a second set of attrition type mills such as the Bauer Mill, to further grind the components and separate the hull and fiber from the starch and gluten. Hull and fiber are generally referred to as bran. Washing screens are used to separate the bran from the starch and gluten. The starch and gluten pass through the screens while the bran does not.

Next, the starch is separated from the protein. This step is done either by centrifugation or by a third grind followed by centrifugation. A commercial centrifugation separator suitable for the present process is the Merco centrifugal separator.

The slurry which contains the starch granules is then dewatered and the resulting granules washed with fresh water and dried in a conventional manner preferably to about 12% moisture.

In this manner, the substantially pure starch of the present invention is extracted from a starch bearing plant of the duwx genotype.

Alternatively to the drying step, the starch may be left in suspension and subject to further modification.

Modification of the starch may also be performed on the dried starch. Typically, in order to change the physical and/or chemical structure of the starch granule, the starch is subject to any one or more of eight general treatments. These treatments comprise bleaching, thin boiling, acid treatment, enzyme treatment, dextrinization or dry roasting, etherification, esterification, and crosslinking. Starches which have been treated by any one or more of these eight treatments listed above are conventionally referred to as chemically modified starch.

Bleaching, often referred to as oxidation, is a modification which does not appreciably alter the granular structure of the starch. Oxidation does, however, tend to lighten the color of the granules and reduce the viscosity of the starch paste.

In order to bleach the starch of the present invention, a slurry of starch is prepared of about 5 to about 40% by weight starch. To the slurry sodium hypochlorite is added with about 6% available chlorine (free chlorine) and the slurry is held at about 110° F. for between about 1 to about 20 hours. The slurry is then neutralized with sodium bisulphite and the resulting granules are dewatered, washed and dried in conventional manner.

Such modification makes the starch of the present invention suitable for laundry starch, paper coating and as a textile size.

In order to produce a thin boiled starch of the present invention, a slurry of starch is prepared of about 5 to about 40% by weight starch. To this slurry, a mineral acid is added and allowed to react with the starch for about 1 to about 100 hours at about 90° to about 120° F. with constant agitation. Such a reaction is done below the gelatinization temperature of the starch. Subsequently, the solution is neutralized, dewatered, washed and dried in conventional manner.

Thin boiling leaves the granules intact and produces a starch product which has a slight reduced viscosity compared to the non-thin boiled starch. If partial or total destruction of the starch granule is sought, the granule may be subjected to acid treatment.

In order to acid treat the starch of the present invention, a slurry of starch about 5 to about 40% by weight starch is prepared. This slurry is reacted with acid, generally a strong acid, at a temperature above gelatinization temperature. Such a procedure is preferably carried out by jet cooking the slurry through a conventional jet cooker with or without acid already in the slurry and then allowing the slurry to react with the acid, adding acid if needed, for a desired period of time or until the desired dextrose equivalent (DE) is reached. The DE is roughly proportional to the length of time for the reaction. Generally, such jet cooking destroys the starch's granular structure.

After acid treatment, the resulting slurry is neutralized, dewatered and dried. Such product may also be subject to conventional carbon treatment and filtration prior to dewatering and drying. Another treatment which degrades the granular structure is enzyme treatment.

In order to enzyme treat the starch of the present invention, a slurry of starch is made up having about 5 to about 40% by weight starch. To this slurry, enzyme is added at the optimum pH and temperature for the enzyme. Some advantage is found by first jet cooking the slurry to open up the starch granules, cooling the slurry to optimum temperature for the enzyme and then adding the enzyme. If the enzyme is jet cook stable then the enzyme can be added to the slurry prior to jet cooking. The slurry may also be treated with acid first to a low DE and then enzyme treated. After enzyme treatment, the product is dewatered and dried. Alternatively, the product may be subject to conventional carbon bleaching and filtration prior to concentration and/or drying.

In order to dextrinize or dry roast the starch of the present invention, acid is added to dry starch granules and the mixture is heated to about 250° to about 350° F. for about 3 to about 72 hours. The product, once removed from the heat, is sold as is. The preferred acids are hydrochloric, phosphoric and any mineral acid. Such a method causes the partial breakdown of the granular structure.

In order to etherify the starch of the present invention, a slurry of starch is made up having about 5 to about 40% by weight starch. The pH of the slurry is adjusted to about 10 to about 12 preferably with sodium hydroxide. Next, an etherification agent such as ethylene oxide or propylene oxide is added to the slurry in an amount of about ½ to about 25% depending on the desired degree of substitution. The reaction conditions are held for about 5 to about 30 hours at about 70° to about 120° F. The slurry is then neutralized with any known acid, dewatered, washed and dried.

In order to crosslink the starch of the present invention, a slurry of starch is made up of about 5 to about 40% by weight starch. The pH of the slurry is adjusted to about 8 to about 12 preferably with sodium hydroxide. Optionally, a salt may be added to the slurry to affect swelling of the granules. Then the slurry is reacted with a crosslinking agent such as phosphorous oxychloride, trimetaphosphate salt, or epichlorohydrin at about 70° to about 120° F. for about ½ to about 5 hours. The length of time of the reaction will depend on the amount of crosslinking agent used and the specific crosslinking agent chosen.

In order to esterify the starch of the present invention, a slurry of starch is prepared having about 5 to about 40% by weight starch. The pH of the slurry is then adjusted to about 7 to about 10 and an esterification agent is added to the slurry such as vinyl ester, acetyl halides, acid anhydrides like acetic anhydride, or succinic anhydride. The esterification agent is added slowly while maintaining the pH of the slurry. The reaction is continued for about ½ to about 5 hours at about 80° to about 120° F. Once the reaction is completed to the desired degree of substitution, the slurry is neutralized, dewatered, washed and dried.

Any combination of these modifications may be employed on starch of the present invention.

It has been found that a sol comprising water and an effective amount of starch extracted from a plant of an duwx genotype exhibits thickening characteristics which makes the sol a good commercial thickener composition. Such thickener compositions are especially useful in foodstuffs.

The sol is prepared by forming a slurry of water and starch of the present invention and subsequently cooking the slurry thereby forming a paste. Preferably, the sol contains the starch of the present invention in the amount of about 1 to about 20% by weight total sol. The slurry is cooked at a temperature of about 90° C. and above to provide thickening characteristics prior to adding to the foodstuff. Cooking time is about 10 minutes. The sol in accordance with the present invention need not be cooked if the starch has already been subjected to a process which makes it cold water swellable. Cooking generally comprises raising the temperature of an aqueous slurry of the starch of the present invention to the gelatinization temperature of the starch and subjecting the starch to shear such that the starch granules rupture and form a paste.

In order to prepare the thickened foodstuff, a sol made in accordance with the present invention is combined with a foodstuff and the composition is cooked to the necessary degree to provide a thickened foodstuff. Conventional mixing is employed to combine the sol with the foodstuff. Cooking of the sol and foodstuff composition is also carried out in a conventional manner.

Alternatively, starch of the present invention is mixed with the foodstuff or a slurry comprising the starch of the present invention and water is mixed with a foodstuff and the resulting mixture is cooked to the desired degree to obtain a thickened foodstuff. When the starch itself or a slurry containing the starch itself is mixed with a foodstuff, the resulting mixture must be cooked in order to provide a thickened foodstuff. The mixing as well as the cooking is accomplished in a conventional manner. Cooking is carried out at a temperature of about 90° C. and above. Cooking time is about 10 minutes but may vary depending on the amount of foodstuff present and the amount of shear that the mix is subject to during cooking.

Such a thickener composition provides high amylose characteristics, such as good gel strength while lowering the temperature needed for cooking as compared to conventional high amylose starches.

These and other aspects of the present invention may be more fully understood with reference to the following examples.

EXAMPLE 1

This example illustrates the extraction of the starch of the present invention from a duwx maize kernel produced by conventional crossbreeding and tests the starch to determine its various characteristics. The tests as well as the results obtained therefrom are given in Table I below. The extraction process as well as the test procedures followed are outlined following Table I below:

TABLE I

| | Present Invention | |
|---|---|---|
| Test | Sample A | Sample B |
| Percent Protein (dry basis) | 0.30% | 0.48% |
| Percent Oil (dry basis) | 0% | 0% |
| Percent Amylose (starch basis) | 0% | 0% |
| DSC Gelatinization Temp. | 70.8° C. | 73.8° C. |
| Regular Brabender Amylograms | | |
| Initial Rise | 77° C. | 74° C. |
| Heating Peak | 283 BU | 435 BU |
| Heating Final | 145 BU | 200 BU |
| Cooling Peak | 165 BU | 245 BU |
| Cooling Final | 165 BU | 240 BU |
| Acid Brabender Amylograms | | |
| Initial Rise | 74° C. | 72.5° C. |
| Heating Peak | 130 BU | 250 BU |
| Heating Final | 20 BU | 20 BU |
| Cooling Peak | 20 BU | 20 BU |
| Cooling Final | 20 BU | 20 BU |
| Brookfield Viscosities (RPMs) | | |
| 10 | 1850 cps | 3050 cps |
| 20 | 1325 cps | 2050 cps |
| 50 | 910 cps | 1280 cps |
| 100 | 705 cps | 935 cps |
| 50 | 906 cps | 1290 cps |
| 20 | 1450 cps | 2000 cps |
| 10 | 2000 cps | 2900 cps |
| Hercules Viscosity (RPMs) | | |
| 550 | 17.4 cps | 18.27 cps |
| 1100 | 15.48 cps | 15.48 cps |
| 1650 | 14.21 cps | 14.21 cps |
| 2200 | 13.86 cps | 13.86 cps |
| 1650 | 15.08 cps | 14.79 cps |
| 1100 | 16.34 cps | 16.34 cps |
| 550 | 20.01 cps | 19.14 cps |

Crossbreeding

In order to perform the crossbreeding process, typically maize plants having the mutant gene du was cross pollinated with maize plants having the mutant gene wx. From the mature ears of some of these plants, kernels having duwx homozygous genotype were produced. Such kernels were used to produce starch in accordance with the present invention and to provide seed for future maize plants of the duwx homozygous genotype.

Extraction Process

The following extraction process was used to extract the starch from the kernel. Sample A was grown in a common corn dent background, OHIO 48, while Sample B was grown in a common corn dent background, W64A.

Steeping

Steeping was carried out by adding maize kernels to water having a 0.2% $SO_2$ content and holding the temperature of the steep water at 50° C. for 48 hours. The steep water was circulated through the steep container. After the 48 hours of steeping, the kernels were dewatered and washed with water.

Gringing and Separating

A mixture of 1:1 kernels to water in a weight ratio was prepared and added to a Waring blender equipped with a dull blade. The Waring blender was put on grind for one minute to mill the starch. The resulting mash was poured onto a 40 mesh screen and what passed through the 40 mesh screen was passed through a 200 mesh screen and subsequently through a 325 mesh screen. The resulting filtrate contained starch and protein. That which did not pass through the first 40 mesh screen was put back into the Waring blender with water in a 1:1 weight ratio. This time a sharp blade was used and the Waring blender was set for one minute on grind. The resulting mash was then subject to a 40 mesh screen and then the filtrate was subjected to a 200 mesh screen and finally to a 325 mesh screen. The final filtrate from both the dull blade grind and the sharp blade grind were dewatered and determined to contain starch and protein. The starch and protein were reslurried and subjected to three separate centrifuges to remove the protein.

The final starch was then filtered and dried in an oven at 110° C. overnight to a moisture content of approximately 10%.

In this manner, starch was extracted from corn kernels in the lab.

The percent protein was determined by a standard Corn Refiners Association (CRA) method (Kjeldahl method).

The percent oil was also done using a standard CRA method by extracting the oil from dry, ground kernels using carbon tetrachloride for sixteen hours.

The percent amylose was determined using standard calorimetric iodine procedures wherein the starch is first gelatinized with sodium hydroxide and then reacted with an iodine solution and the resulting sample measured using a spectrophotometer in a 1 cm cell at 600 nm against a blank of 2% iodine solution.

The DSC gelatinization temperature was measured using a scanning calorimeter manufactured by Mettler Model No. 300 using a 30% solid starch following the procedure outlined in the owner's manual for that model.

Two Brabender amylograms were run; one in a non-acid environment and one in an acid environment. Both were run at 5½% solids using a 90 gram sample with 125 gram cartridge at 100 RPM. The exact procedure used is outlined in the Amylograph Handbook of the American Association of Cereal Chemists, 1982 edition at pages 17 and 18. The respective paddle for the 90 gram cup was used. The difference between the acid and the regular Brabender was that 1.56 grams of glacial acetic acid was added to the sample to drop the pH of the sample to about 3 prior to running of the samples. Such acid test is used to show stability in acid conditions.

The initial rise was the temperature at which the pen moves away from the baseline.

Both acid and regular samples were subjected to identical heat profiles. The sample started at room temperature and the rapid heat mode of the instrument was used to heat the sample to 50° C. Once 50° C. was reached, the instrument was set at a controlled rate of heating, 1½° C./minute, until a temperature of 95° C. was reached. The sample was then held at 95° C. for 30 minutes. During this period of heating, the highest viscosity obtained by the sample was labeled Heating Peak. The Heating Final was the last viscosity obtained by the sample at the end of the heating cycle. Next, the sample was cooled at 1½° C. to a temperature of 50° C. The sample was then held at 50° C. for 30 minutes. The largest viscosity measurement taken during this cooling cycle was the Cooling Peak and the final viscosity at the end of the cooling cycle was the Cooling Final.

Brabender curves are a well known tool for determining characteristics of starch.

Brookfield viscosities, another well known measurement used for analysing starch, were measured for the starch of the present invention in Table I above. In order to run this test, the starch slurry as it came from the regular, non-acid Brabender test was used for the Brookfield test.

A Brookfield viscometer Model RV was used following standard procedures to obtain these values. The tests were run at 50° C. with each RPM being run for a twenty second time interval.

Hercules viscosities were run on a Kaltec Model No. 244RC (manufactured Aug. 31, 1975) following the procedure outlined in the operators manual. Each test was run at 75° F. using bob A. A 25 gram sample of starch paste as obtained from the acid Brabender was used for this test. Hercules viscosities measured high shear resistance of starch in an acid environment.

EXAMPLE 2

This example compares amylograms for a conventional chemically modified crosslinked starch, the starch of the present invention, and a conventional waxy starch.

FIG. 1 depicts Brabender amylograms for a commercial, chemically modified, crosslinked starch, POLAR GEL 10, the starch of the present invention and a commercial waxy starch. The graph labelled No. 1 represents POLAR GEL 10, No. 2 the starch of the present invention, and No. 3 a commercial waxy starch.

The amylograms in FIG. 1 were run at 5½% solids using a 90 gram sample and using the procedure as outlined in Example 1 above.

POLAR GEL 10 is a commercial, chemically modified, crosslinked waxy starch sold by American Maize-Products Company of Hammond, Ind. POLAR GEL 10 is treated with propylene oxide and crosslinked with phosphorus oxychloride. The unmodified commercial waxy starch was obtained from American Maize- Products Company also. The starch of the present invention was Sample A of Example 1 above.

EXAMPLE 3

This example illustrates preparing a thickener composition in accordance with the present invention.

The starch of the present invention as extracted in Example 1 above is mixed with water in an amount to produce a slurry having 10% by weight starch. The slurry when cooked at about 90° C. for ten minutes produces a thickener composition.

EXAMPLE 4

This example illustrates making a barbecue sauce using the starch of the present invention. Table II below lists the ingredients and the procedure for making the sauce.

TABLE II

| Ingredients | % by Weight Present Invention |
| --- | --- |
| Tomato paste, 25% solids | 23.51 |
| Water | 45.63 |
| Cider vinegar, 50 gr. | 11.62 |
| Brown sugar | 6.68 |
| 44/62 Corn Syrup Unmixed* | 9.18 |
| Smoke flavor | 0.04 |
| Salt | 0.56 |
| Present invention starch | 1.95 |
| Mustard flour | 0.21 |
| Red pepper | 0.08 |
| Onion granules | 0.13 |
| Garlic powder | 0.13 |
| | 100.00 |

*44% dry solids, 62 DE

Procedure

All the ingredients are combined and then cooked at 195° to 200° F. for 3 to 5 minutes.

EXAMPLE 5

This example illustrates making a bavarian cream pie using starch of the present invention.

The following ingredients and procedure is used:

TABLE III

| | FILLING |
| --- | --- |
| Ingredients | % by Weight Present Invention |
| Whole milk, fresh 3.5% | 72.794 |
| Sugar, fine grain | 17.586 |
| Salt, Flour | 0.101 |
| Present Invention | 5.410 |
| Banana Flavoring | 0.300 |
| Egg Yolk, fresh | 3.809 |
| | 100.000 |

Procedure

All of the pie filling ingredients except for the egg yolks are combined and cooked at 195° F. for 3 to 5 minutes. Then the ingredients are cooled to 120° F. with constant stirring. Next, the egg yolks are added and the admixture well blended. This mixture is then added to the conventional pie crust and allowed to cool to room temperature before serving.

EXAMPLE 6

This example illustrates preparing a thickener composition in accordance with the present invention.

The starch of the present invention as extracted in Example 1 above is mixed with water in an amount to produce a slurry having 10% by weight starch. The sol has a bland taste. The sol when cooked at about 90° C. for ten minutes produces a thickener composition.

Although the use of the present invention has been disclosed primarily with respect to foods, this is not deemed to limit the scope of this invention. The present invention can be used in other fields of industry such as paints, plastics, paper, wallboards.

It will be understood that the claims are intended to cover all changes and modifications of the preferred embodiments of the invention herein chosen for the purposes of illustration which do not constitute a departure from the spirit and scope of the invention.

What is claimed is:

1. A thickened foodstuff comprising a foodstuff, water and having as an essential thickening ingredient an effective amount of a natural chemically modified starch, said natural chemically modified starch being a starch extracted from a starch bearing plant having a dull waxy genotype, said starch having a rounded heating peak not exceeding about 500 Brabender Units, said starch not having been chemically modified.

2. The thickened foodstuff of claim 1 wherein the starch bearing plant is maize and the starch is extracted from kernels of maize.

3. The thickened foodstuff of claim 1 wherein the amount of starch present is about 1% to about 20% by weight based on the total weight of thickened foodstuff.

4. The thickened foodstuff of claim 3 wherein the starch bearing plant is maize and the starch is extracted from kernels of maize.

5. A method for making a thickened foodstuff comprising combining a foodstuff, water and an effective amount of a natural chemically modified starch, said natural chemically modified starch being a starch extracted from a starch bearing plant having a dull waxy geotype, said starch having a rounded heating peak not exceeding about 500 Brabender Units, said starch not having been chemically modified; and cooking said combination as necessary to produce a thickened foodstuff.

6. The method of claim 5 wherein the starch is extracted from a maize kernel.

7. The method of claim 6 wherein the amount of starch added is about 1% to about 20% by weight based on total weight of foodstuff.

8. The starch of claim 6 in granular form.

9. A method for making a thickened foodstuff comprising:
(a) forming a slurry comprising water and an effective amount of a natural chemically modified starch, said naturally chemically modified starch being a starch extracted from a starch bearing plant having a dull waxy genotype, said starch having a rounded heating peak not exceeding about 500 Brabender Units, said starch not having been chemically modified;
(b) cooking the slurry as necsessary to produce a sol; and
(c) combining the sol with a foodstuff to produce a thickened foodstuff.

10. The method of claim 9 wherein the cooking step is conducted at a temperature equal to or greater than the gelatinization temperature of the starch and subjects the starch to shear.

11. The method of claim 9 wherein the plant is maize.

12. The method of claim 11 wherein the amount of starch added is about 1% to about 20% by weight based on total weight of foodstuff.

* * * * *